(12) United States Patent
Nakamura et al.

(10) Patent No.: US 9,371,013 B2
(45) Date of Patent: Jun. 21, 2016

(54) LOCK MECHANISM FOR SEAT TRACK SLIDE DEVICE (71) Applicant: GIFU AUTO BODY CO., LTD., Gifu-ken (JP)

(72) Inventors: Motohisa Nakamura, Kakamigahara (JP); Takayuki Ogasawara, Kakamigahara (JP); Masashi Komiyama, Kakamigahara (JP)

(73) Assignee: Gifu Auto Body Co., Ltd., Gifu-Ken (JP)

( * ) Notice: Subject to any disclaimer, the term of this patent is extended or adjusted under 35 U.S.C. 154(b) by 18 days.

(21) Appl. No.: 13/814,711

(22) PCT Filed: Oct. 10, 2012

(86) PCT No.: PCT/JP2012/076252
§ 371 (c)(1),
(2) Date: Feb. 6, 2013

(87) PCT Pub. No.: WO2014/057554
PCT Pub. Date: Apr. 17, 2014

(65) Prior Publication Data
US 2014/0097317 A1 Apr. 10, 2014

(51) Int. Cl.
*B60N 2/07* (2006.01)
*B60N 2/08* (2006.01)

(52) U.S. Cl.
CPC ............... *B60N 2/08* (2013.01); *B60N 2/0705* (2013.01); *B60N 2/0715* (2013.01); *B60N 2/085* (2013.01); *B60N 2/0818* (2013.01); *B60N 2/0881* (2013.01)

(58) Field of Classification Search
USPC ............ 248/424, 425, 429, 430, 423, 420; 297/344.1, 318, 341
See application file for complete search history.

(56) References Cited

U.S. PATENT DOCUMENTS

| 6,688,574 | B2 * | 2/2004 | Okazaki et al. | 248/424 |
| 7,314,204 | B2 * | 1/2008 | Kohmura | 248/430 |
| 7,717,392 | B2 * | 5/2010 | Sakakibara et al. | 248/429 |
| 8,469,327 | B2 * | 6/2013 | Hayashi | 248/429 |
| 8,469,328 | B2 * | 6/2013 | Nakamura et al. | 248/430 |
| 8,490,940 | B2 * | 7/2013 | Ito et al. | 248/429 |
| 8,517,328 | B2 * | 8/2013 | Wieclawski et al. | 248/429 |

(Continued)

FOREIGN PATENT DOCUMENTS

| JP | 2003252086 | 9/2003 |
| JP | 2005-225386 A | 8/2005 |

(Continued)

OTHER PUBLICATIONS

European Search Report for European Application No. 12819046 dated Jan. 15, 2015.

*Primary Examiner* — Nkeisha Smith
(74) *Attorney, Agent, or Firm* — Patterson Thuente Pedersen, P.A.

(57) ABSTRACT

Seat tracks each include a lower rail, an upper rail, a lock lever, and a handle. When a handle is operated, the lock lever is set in a locking state or an unlocking state by engaging and disengaging the lock lever with and from lock recesses in the lower rail. The lock lever is supported pivotally with respect to the upper rail by pivot support portions, in which support holes in side plates of the upper rail and protrusions on arm plates of the lock lever are fitted together. A torsion coil spring, which interlocks the handle and the lock lever, includes a second stopper, which hooks on first stoppers provided on the arm plates of the lock lever.

4 Claims, 6 Drawing Sheets

(56) References Cited

U.S. PATENT DOCUMENTS

| | | | |
|---|---|---|---|
| 8,616,515 B2* | 12/2013 | Hayashi | 248/429 |
| 8,695,937 B2* | 4/2014 | Yamada et al. | 248/429 |
| 8,714,509 B2* | 5/2014 | Hayashi | 248/429 |
| 8,757,577 B2* | 6/2014 | Naoki | 248/429 |
| 8,770,534 B2* | 7/2014 | Nakamura et al. | 248/429 |
| 2003/0085330 A1* | 5/2003 | Lee | 248/430 |
| 2007/0069099 A1* | 3/2007 | Kohmura | 248/430 |
| 2008/0048476 A1* | 2/2008 | Kojima et al. | 297/341 |
| 2012/0132777 A1* | 5/2012 | Nakamura et al. | 248/429 |
| 2012/0132778 A1* | 5/2012 | Nakamura et al. | 248/429 |
| 2012/0318948 A1* | 12/2012 | Yamada et al. | 248/429 |
| 2013/0056604 A1* | 3/2013 | Hayashi | 248/429 |
| 2013/0119221 A1* | 5/2013 | Hayashi | 248/429 |
| 2013/0119222 A1* | 5/2013 | Hayashi | 248/429 |
| 2013/0206952 A1* | 8/2013 | Yamada et al. | 248/429 |
| 2013/0214112 A1* | 8/2013 | Kawamura et al. | 248/429 |
| 2013/0320178 A1* | 12/2013 | Harvey et al. | 248/429 |
| 2013/0341479 A1* | 12/2013 | Yamada et al. | 248/430 |
| 2014/0027600 A1* | 1/2014 | Kato et al. | 248/429 |
| 2014/0042289 A1* | 2/2014 | Kawano | 248/429 |
| 2014/0110552 A1* | 4/2014 | Yamada et al. | 248/429 |
| 2014/0110553 A1* | 4/2014 | Hoshihara et al. | 248/429 |
| 2014/0138510 A1* | 5/2014 | Yamada et al. | 248/429 |
| 2014/0145054 A1* | 5/2014 | Yamada et al. | 248/429 |
| 2014/0239141 A1* | 8/2014 | Yamada et al. | 248/430 |

FOREIGN PATENT DOCUMENTS

| | | |
|---|---|---|
| JP | 2005225262 | 8/2005 |
| JP | 2009-179122 A | 8/2009 |
| JP | 2010100077 | 5/2010 |
| JP | 2011-245956 A | 12/2011 |
| JP | 2012-111378 A | 6/2012 |
| JP | 2012-111379 A | 6/2012 |

* cited by examiner

LOCK MECHANISM FOR SEAT TRACK SLIDE DEVICE

RELATED APPLICATIONS

The present application is a National Phase entry of PCT Application No. PCT/JP2012/076252, filed Oct. 10, 2012, the disclosure of which is hereby incorporated by reference herein in its entirety.

FIELD OF THE INVENTION

The present invention relates to a lock mechanism for a seat track slide device of a vehicle, the lock mechanism being capable of assuming a locking state, in which an upper rail is kept from moving relative to a lower rail, and an unlocking state, in which the upper rail is allowed to move.

BACKGROUND OF THE INVENTION

Conventionally, in a lock mechanism for a seat track slide device, a lock lever accommodated in an upper rail is pivotally supported in the upper rail by a support shaft, a proximal end of a handle inserted into the upper rail from a front end thereof and a front end of a lock lever are joined to each other in the upper rail by an interlock support portion, so that the lock lever is interlocked with the handle and can be engaged with and disengaged from a lock recess in the lower rail as described in Patent Document 1, which will be discussed below. In this conventional lock mechanism, a lock lever is pivotally supported relative to an upper rail by a support shaft held between side plates of the upper rail. Therefore, assembly of the upper rail and the lock lever involves tedious work.

Under such circumstances, a lock lever is inserted into an upper rail and pivotally supported relative to the upper rail by a pivot support portion formed by inserting a protrusion into a recess in the upper rail in devices described in Patent Documents 2 and 3, which are discussed below, for example. Also, stoppers are provided that maintain the recess and the protrusion of the pivot support portion in an inserted state. Specifically, this upper rail has a pair of side plates, which are arranged side by side in a direction intersecting with a moving direction of the upper rail with an interval formed in between, and a top plate connecting the two side plates to each other. The lock lever has a pair of arm plate portions, which run in a direction intersecting with the moving direction of the upper rail with an interval formed in between. Of the recess and the protrusion of the pivot support portion, the recess is provided in the side plates of the upper rail, and the protrusions are provided on the arm plate portions of the lock member. In the top plate of the upper rail, a second stopper is placed between first stoppers provided in the two arm plate portions of the lock lever. Owing to engagement with the first and second stoppers, it is possible to prevent the protrusions and the recess from being separated from each other in a direction opposite to a direction in which the protrusions and the recesses of the pivot support portion are fitted by insertion, and it is possible to maintain the protrusions and the recesses of the pivot support portion in the inserted state.

PRIOR ART DOCUMENT

Patent Document

Patent Document 1: Japanese Laid-Open Patent Publication No. 2005-225386

Patent Document 2: Japanese Laid-Open Patent Publication No. 2012-111379

Patent Document 3: Japanese Laid-Open Patent Publication No. 2012-111378

SUMMARY OF THE INVENTION

In the devices described in Patent Documents 2 and 3 cited above, the second stopper, which is formed in a cantilever shape by use of a cutout in the top plate of the upper rail, is bent downward, fit between the two side plates of the upper rail, and placed between the first stoppers in the two arm plate portions of the lock lever. Consequently, it is necessary to form the cantilevered second stopper by use of the cutout in the top plate of the upper rail and bend the second stopper downward, involving tedious work for forming the second stopper and for placing the second stopper plate between the two arm plate portions of the lock member.

Also, a torsion coil spring has a coil portion and two arm portions extending from the coil portion. One of the two arm portions of the torsion coil spring is supported by a handle, and the other arm portion is supported by a hook hole in the top plate of the upper rail, so that it is necessary to form the hook hole in the top plate of the upper rail. This involves not only tedious work for forming the hook hole, but also a possibility that the arm portion of the torsion coil spring extending to the outside of the upper rail from the hook hole may be obstructive.

Accordingly, it is an objective of the present invention to provide a lock mechanism for a seat track slide device in which assembly of an upper rail and a lock member is simplified at a pivot support portion, where the lock member is assembled with the upper rail. It is also an objective to provide a lock mechanism capable of maintaining an upper rail and a lock member in an assembled state at a pivot support portion by a simple structure using existing components.

The present invention will be described using the reference symbols denoted in the drawings (FIGS. 1 to 6B) of the embodiments described below.

A lock mechanism for a seat track slide device according to the invention of claim 1 is configured as described below.

A seat track slide device (1) comprises a lower rail (4) configured to be fixed to a floor (2), an upper rail (6) configured to be fixed to a seat (5) and supported movably relative to the lower rail (4), a plurality of lock portions (12) formed in the lower rail (4) to be arranged in a moving direction (X) of the upper rail (6), a lock member (22) attached to the upper rail (6), and a handle (31) extending from the lock member (22) attached to the upper rail (6). The lock member (22) is inserted in the upper rail (6) and has a pair of arm plates (23) arranged side by side in a direction intersecting with the moving direction (X) of the upper rail (6) with an interval formed in between. The lock member (22) is supported pivotally with respect to the upper rail (6) by a pivot support portion (29), in which a recess (20) formed in one of the upper rail (6) and at least one of the arm plates (23) of the lock member (22), is fitted on a protrusion (24) formed on the other of the upper rail (6) and the at least one of the arm plates (23) of the lock member (22). The lock member (22) and the handle (31) are interlocked with each other by an elastic force of a spring (33) supported between the handle (31) and the lock member (22) attached to the upper rail (6). The lock member (22) can be set to a locking state or an unlocking state by operating the handle (31) to engage and disengage the lock member (22) with and from the lock portions (12) of the lower rail (4).

Each arm plate of the lock member (22) has a first stopper (28). The spring (33) has a second stopper (36a), which engages with the first stoppers (28). Engagement between the first and second stoppers (28, 36) prevents the protrusion (24) and the recess (20) from coming off from each other in directions (YB) opposite to directions (YF) in which the protrusion (24) and the recess (20) are fitted together in the pivot support portion (29), so that the protrusion (24) and the recess (20) of the pivot support portion (29) are kept fitted together. The pair of arm plates (23) of the lock member (22) has elasticity, which causes the arm plates (23) to be separated from each other when the arm plates (23) are flexed to approach to each other, for example. Incidentally, the recess (20) is a concept that implies not only a hole having a closed end but also a through hole.

In the invention of claim 1, it is only needed to fit the recess (20) and the protrusion (24) together for pivotally supporting the lock member (22) fitted in the upper rail (6) with respect to the upper rail (6). It is therefore possible to configure the pivot support portion (29) that is easy to assemble without the need for a pivot axis. Also, it is possible to keep the recess (20) and the protrusion (24) fitted together by means of the first and second stoppers (28, 36a). As it is possible to fit the protrusion (24) and the recess (20) of the pivot support portion (29) together while flexing the pair of arm plates (23) of the lock member (22) to bring the arm plates (23) close to each other against the elasticity, for example, the lock member (22) fitted in the upper rail (6) can easily be assembled therewith. Also, the second stopper (36a) provided on the spring (33) can be placed between the first stoppers (28) of the pair of arm plates (23) of the lock member (22) after assembling the lock member (22) in the upper rail (6). This makes it possible to prevent the protrusion (24) and the recess (20) of the pivot support portion (29) from coming off from each other. Further, the spring (33) of an existing type, which interlocks the handle (31) and the lock member (22) with each other in the vicinity of the upper rail (6), is provided with the second stopper (36a). This makes it possible to maintain the upper rail (6) and the lock member (22) in an assembled state at the pivot support portion (29) with a simple structure by use of an existing component.

According to the invention of claim 2 based on the invention of claim 1, the lock member (22) has lock portions (27), which are engaged with and disengaged from the lock portions (12) attached to the lower rail (4). The pivot support portion (29), in which the recess (20) and the protrusion (24) are fitted together, is provided on the upper rail (6) and the arm plates (23) of the lock member (22) and between the lock portions (27) of the lock member (22) and the handle (31). In the invention of claim 2, it is easy to engage and disengage the lock portions (27) of the lock member (22) with and from the lock portions (12) of the lower rail (4) by operating the handle (31).

According to the invention of claim 3 based on the invention of claim 2, the second stopper (36a) of the spring (33) and the first stoppers (28) of the arm plates (23) of the lock member (22) are provided between the pivot support portion (29) and the handle (31). In the invention of claim 3, even if a portion of the lock member (22) close to the lock portions (27) is shaped to provide increased stiffness, it is possible to form the second stopper (36a) of the spring (33) into a shape that allows the second stopper (36a) to be easily fitted between the first stoppers (28) of the pair of arm plates (23) of the lock member (22) at the portion of the lock member (22) close to the handle (31).

In the lock member (22) according to the invention of claim 4 based on the invention of claim 3, a support plate (26) extends from at least one of the arm plates (23), which have the first stoppers (28), and the handle (31) is connected to the support plate (26). In the invention of claim 4, it is possible to connect the handle (31) to the arm plates (23), which are arranged side by side with an interval formed in between, so that the second stopper (36a) of the spring (33) can easily be fitted between the first stoppers (28) of the pair of arm plates (23) of the lock member (22).

In the lock member (22) according to the invention of claim 5 based on the invention of claim 4, in one of the arm plates (23) from which the support plate (26) extends, the first stopper (28), which is continuous with the support plate (26), is located between the pivot support portion (29) and the support plate (26) and is formed adjacent to the pivot support portion (29) In the other arm plate (23), the first stopper (28), which faces the first stopper (28) of the arm plate (23) from which the support plate (29) extends, extends in a cantilevered fashion and is adjacent to the pivot support portion (29). In the invention of claim 5, the first stopper (28) that faces the first stopper (28) of the arm plates (23) from which the support plate (26) extends in a cantilevered fashion from the other arm plate (23) and functions as a leaf spring. Therefore, the cantilevered first stopper (28) is easy to flex and the second stopper (36a) of the spring (33) can be easily fitted between the first stoppers (28) of the pair of arm plates (23) of the lock member (22). Also, as the first and second stoppers (28, 36a) are situated adjacent to the pivot support portion (29), the pivot support portion (29) better perform the function of preventing the protrusion (24) and the recess (20) from coming off from each other.

According to the invention of claim 6 based on the invention of any one of claims 1 to 5, the spring (33) is a torsion coil spring having a coil portion (34) and a pair of arm portions (35, 36) extending from the coil portion (34). One of the arm portions (35) is supported by the handle (31), and the other arm portion (36) is provided with the second stopper (36a). In the invention of claim 6, the arm portion (36) extending from the torsion coil spring (33) for interlocking the lock member (22) with the handle (31) serves also as the second stopper (36a). This makes it possible to reduce the number of components and achieve a simple configuration.

According to the invention of claim 7 based on the invention of any one of claims 1 to 6, the protrusion (24) of the pivot support portion (29) is loosely fitted in the recess (20) thereof and is pressed against the recess (20) by an elastic force of the spring (33). In the invention of claim 7, it is possible to prevent chattering of the protrusion (24) in the recess (20).

Technical ideas other than those disclosed in the appended claims will now be described using the reference symbols denoted in the drawings of the embodiments.

According to an eighth invention based on the invention of any one of claims 1 to 7, all or part of interlock support portions (30, 32), which are provided between an end of the lock member (22) and an end of the handle (31), is exposed to an external space (S) at an end (6a) of the upper rail (6) to be aligned with the end (6a) of the upper rail (6) in the moving direction (X) of the upper rail (6), wherein the interlock support portion (32) of the handle (31) can pivot about a fulcrum portion (30f) provided at the end (6a) of the upper rail (6) relative to the lock member (22), which is held in the locking state in the external space (S) at the end (6a) of the upper rail (6). In the eighth invention, even if a force that may unlock the lock member (22) is applied to the seat track slide device (1), the interlock support portion (32) of the handle (31) and the interlock support portion (30) of the lock member (22) pivot relative to each other against the elasticity, making it possible to maintain the lock member (22) in the locking state. Also, the fulcrum portion (30f) provided on the interlock support portion (30) of the lock member (22) is arranged in the external space (S) at the end (6a) of the upper rail (6). Therefore, relative pivot motion is produced in the external space (S) at the end (6a) of the upper rail (6) so that the handle (31) and the upper rail (6) do not contact each other, making it possible to increase the range of the relative pivot motion of the handle (31) and the lock member (22) and enhance a function of maintaining the locking state.

According to a ninth invention based on the eighth invention, the interlock support portion (30) of the lock member (22) extends into the external space (S) at the end (6a) of the upper rail (6) from the end (6a) of the upper rail (6). In the ninth invention, the interlock support portion (30) of the lock member (22) extends into the external space (S) at the end (6a) of the upper rail (6) even in a case where each seat track (3) is small-sized with the lock member (22) fitted in the upper rail (6). It is therefore possible to increase the range of the relative pivot motion of the lock member (22) and enhance the function of maintaining the locking state.

According to a tenth invention based on the invention of claim 6, all or part of the coil portion (34) of the torsion coil spring (33) is accommodated in the upper rail (6) between the interlock support portion (30) of the lock member (22) and the end (6a) of the upper rail (6). In the tenth invention, one arm portion (35) of the torsion coil spring (33) extends into the external space (S) at the end (6a) of the upper rail (6) even in a case where each seat track (3) is small-sized with the coil portion (34) of the torsion coil spring (33) fitted in the upper rail (6). It is therefore possible to impart an ability to produce an elastic force to the interlock support portion (32) of the handle (31).

According to an eleventh invention based on the tenth invention, one arm portion (35) of the pair of arm portions (35, 36) extending from the coil portion (34) is supported by the interlock support portion (32) of the handle (31) between the end (6a) of the upper rail (6) and the fulcrum portion (30f) of the interlock support portion (30) of the lock member (22). In the eleventh invention, the interlock support portion (30) of the lock member (22) is located on one of the sides of the fulcrum portion (30f) of the interlock support portion (30) of the lock member (22). Therefore, if the handle (31) is operated on the other side, the interlock support portion (32) of the handle (31) relatively pivots about the fulcrum portion (30f) of the interlock support portion (30) of the lock member (22), making it possible to increase the range of the relative pivot motion of the handle (31) and the lock member (22).

According to a twelfth invention based on the invention of any one of claims 1 to 7 or the invention of any one of claims 8 to 11, the spring (33) serves also as a lock spring for keeping the lock member (22) in the locking state in addition to an interlock spring for holding and interlocking the handle (31) and the lock member (22) and a retraction spring, which acts as resistance to the relative pivot motion of the handle (31) and the lock member (22). The twelfth invention makes it possible to achieve a reduction in the number of components as well as a reduction in size.

According to a thirteenth invention based on the invention of any one of claims 1 to 7 or the invention of any one of claims 8 to 12, the seat tracks (3) each including the lower rail (4), the upper rail (6), the lock member (22) and the handle (31) are provided on both sides in a direction (Y) intersecting with the moving direction (X) of the upper rail (6), in which handles (31) of the individual seat tracks (3) can move in an interlocked manner. In the seat track slide device (1) of the thirteenth invention, handles (31) of individual seat tracks (3) are interlocked with each other and can produce, in particular, advantages of the invention of any one of claims 1 to 7 or the invention of any one of claims 8 to 12.

Effects of the Invention

The present invention only requires that the recess (20) and the protrusion (24) be fitted together in the pivot support portion (29) of the lock member (22) positioned in the upper rail (6). This not only simplifies assembly of the upper rail (6) and the lock member (22), but makes it possible to maintain the upper rail (6) and the lock member (22) in an assembled state by keeping the recess (20) and the protrusion (24) fitted together by means of first and second stoppers (28, 36a) with a simple structure including a reduced number of components using a spring (33) of an existing type.

DETAILED DESCRIPTION OF THE PREFERRED EMBODIMENTS

A lock mechanism for a seat track slide device according to one embodiment of the present invention will now be described hereinbelow with reference to the accompanying drawings.

Figure 1A:
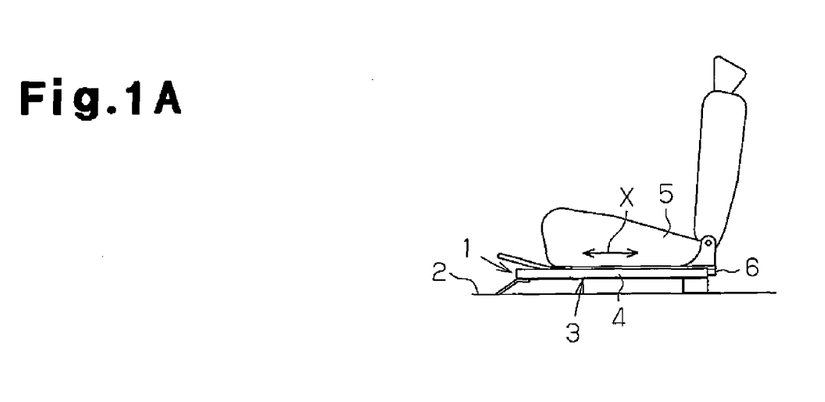
FIG. 1A is a partial side view schematically depicting a state in which a seat track slide device is installed on a floor of a vehicle.
Figure 1B:
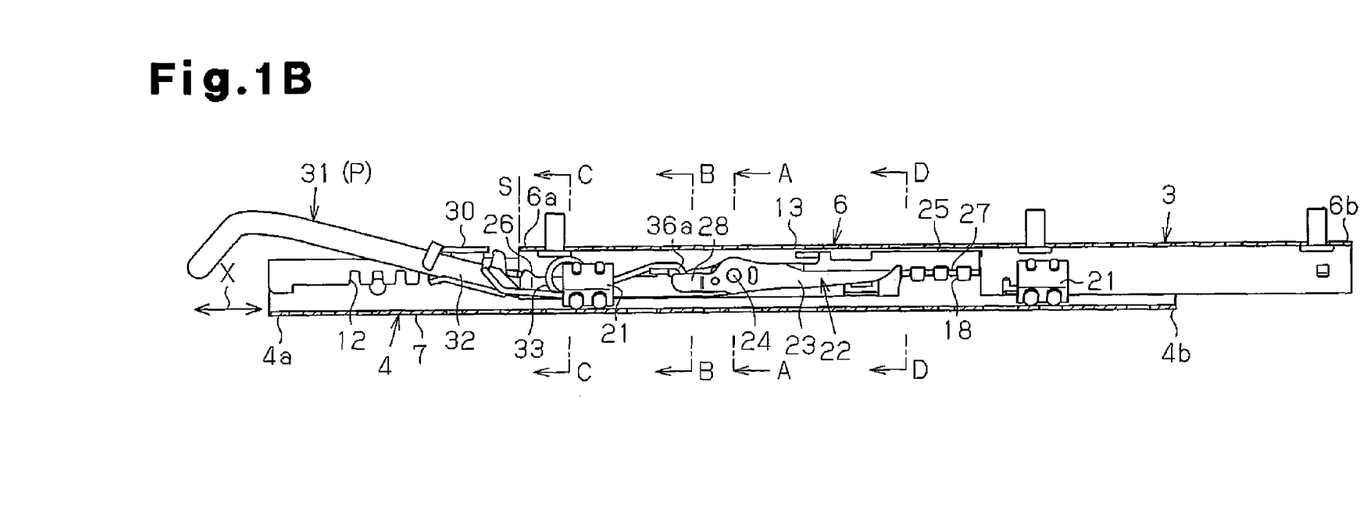
FIG. 1B is a cross-sectional view of the entirety of the seat track slide device as seen from a side.

As schematically illustrated in FIG. 1A, seat tracks 3 constituting part of a seat track slide device 1 are fixed to a floor 2 of a vehicle on both left and right sides in a direction perpendicular to a fore-and-aft direction X. The individual seat tracks 3 are configured such that lower rails 4 are fixed to the floor 2, and upper rails 6 configured to be fixed on both left and right sides of a seat 5 are inserted into the lower rails 4 and supported movably in the fore-and-aft direction X.

Figure 2:
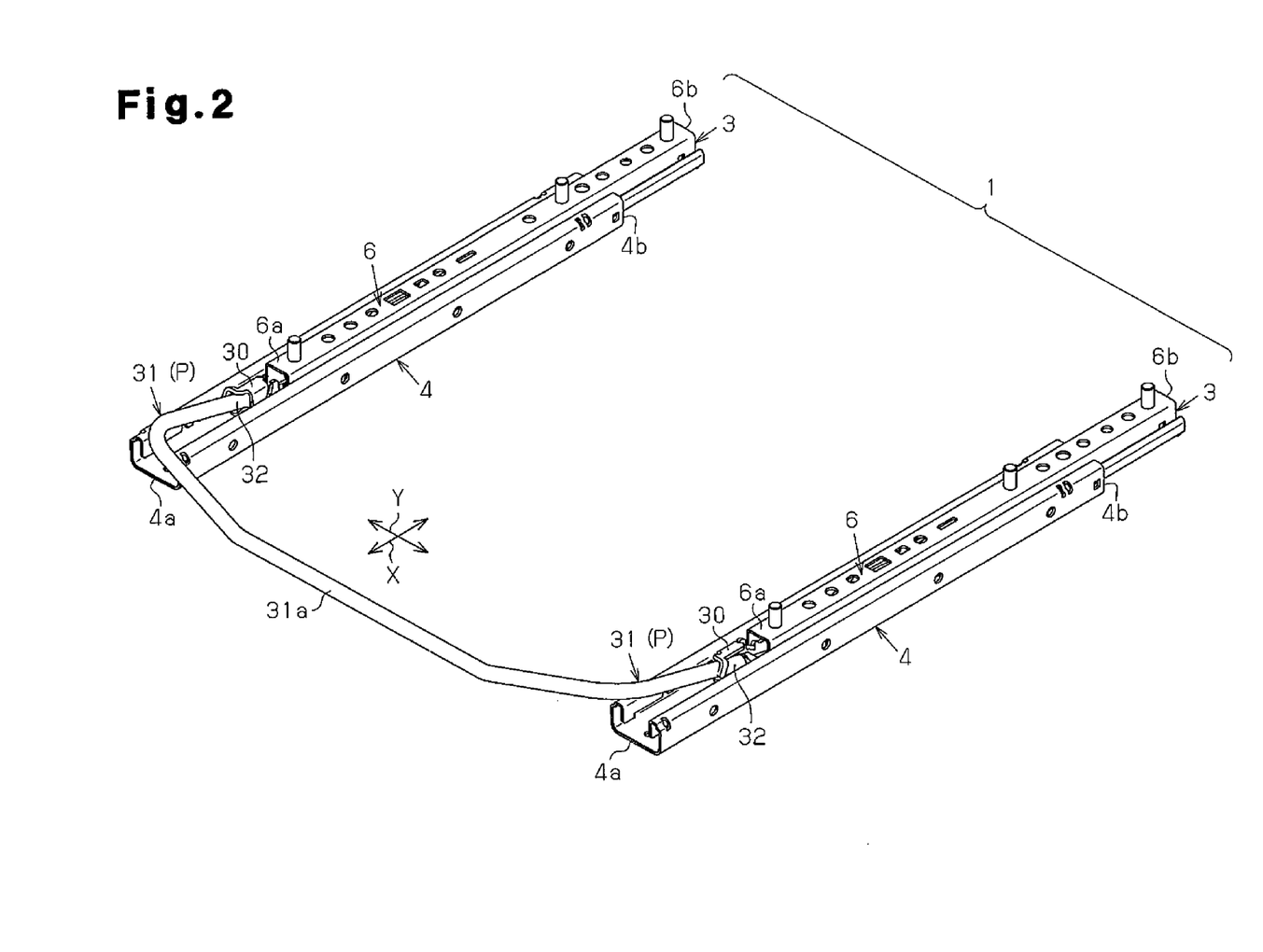
FIG. 2 is a perspective view depicting the entirety of the seat track slide device.
Figure 3:
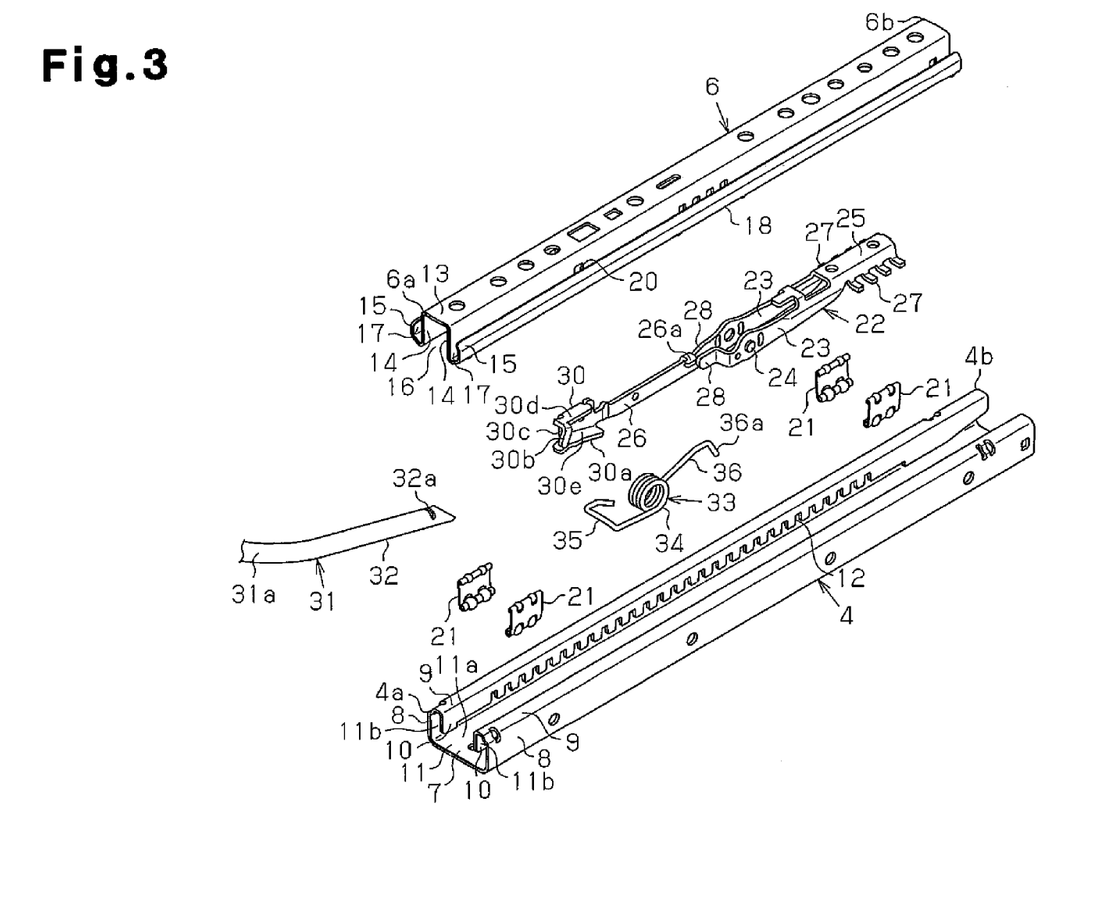
FIG. 3 is an exploded perspective view depicting a seat track on one side of the seat track slide device.
Figure 4A:
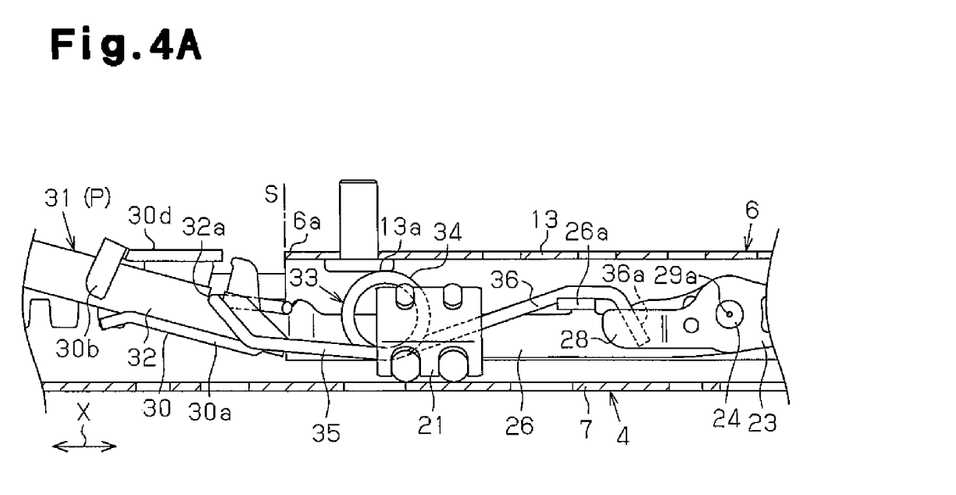
FIG. 4A is a partial cross-sectional view of the seat track slide device as seen from one side.
Figure 4B:
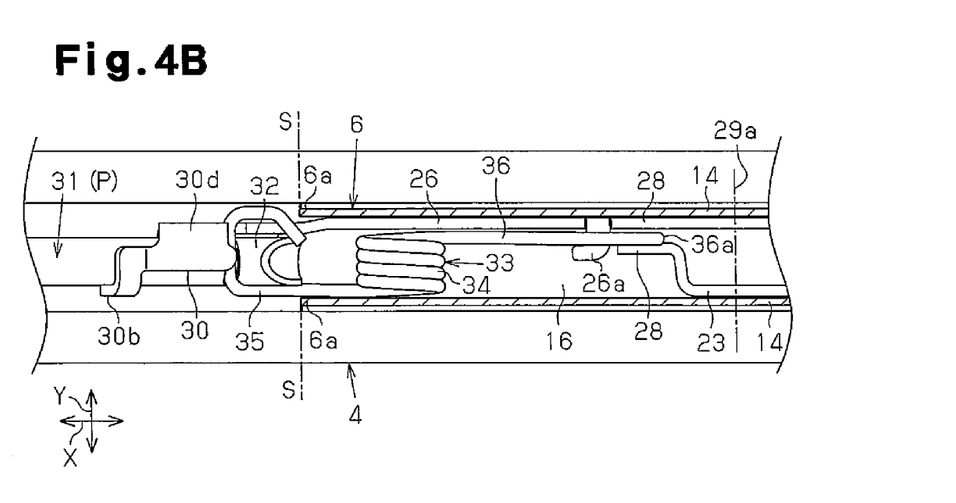
FIG. 4B is a partial cross-sectional view of the seat track slide device as seen from above.

In the seat track slide device 1 illustrated in FIG. 2, the lower rail 4 of each seat track 3 depicted in FIGS. 3 and 5A-5E extends in the fore-and-aft direction X between a front end 4a and a rear end 4b, the lower rail 4 including a bottom plate 7, side plates 8, which are bent upward from the left and right ends of the bottom plate 7, top plates 9, which are bent inward from upper ends of the left and right side plates 8 to face each other in a left-right direction Y (a direction perpendicular to the fore-and-aft direction X, which is a moving direction of the upper rail 6), and end plates 10, which are bent downward from the left and right top plates 9. An accommodation chamber 11 surrounded by the bottom plate 7, the left and right side plates 8, the left and right top plates 9, and the left and right end plates 10 has an opening 11a formed between the left and right end plates 10 and extending in the fore-and-aft direction X and grooves 11 b formed between the side plates 8 and the respective end plates 10 and extending in the fore-and-aft direction X. Also, the accommodation chamber 11 opens upward at the opening 11a as well as in the fore-and-aft direction X at the front end 4a and the rear end 4b. The left and right end plates 10 each have a plurality of lock recesses 12 (lock portions) formed by cutting out the end plates 10 upward from lower edges thereof, the lock recesses 12 being arranged over a prescribed range close to the front end 4a in the fore-and-aft direction X.

In the seat track slide device 1 illustrated in FIG. 2, the upper rail 6 depicted in FIGS. 3 and 5A-5E extends in the fore-and-aft direction X between a front end 6a and a rear end 6b, the upper rail 6 including a top plate 13, side plates 14, which are bent downward from the left and right ends of the top plate 13 with an interval formed in between in the left-right direction Y, and guide plates 15, which are bent outward in the left-right direction Y and upward from lower ends of the left and right side plates 14. An accommodation chamber 16 surrounded by the top plate 13 and the left and right side plates 14 opens downward as well as in the front and rear directions X at the front end 6a and the rear end 6b. Grooves 17 formed between the side plates 14 and the respective guide plates 15 open upward as well as in the front and rear directions X at the front end 6a and the rear end 6b. Approximately at middle portions of the side plates 14 and the respective guide plates 15 in the fore-and-aft direction X, a plurality of holes 18 formed by cutting out the side plates 14 and the guide plates 15 upward from lower edges thereof are arranged in the fore-and-aft direction X. A support hole 20 (recess) extending through each of the left and right side plates 14 is formed close to the front end 6a.

As depicted in FIGS. 1B, 4A, 4B, and 5A-5E, the upper rail 6 is inserted into the accommodation chamber 11 of the lower rail 4. The top plate 13 and the left and right side plates 14 of the upper rail 6 project upward from the opening 11a of the accommodation chamber 11, the side plates 14 facing the respective end plates 10 of the lower rail 4. The guide plates 15 of the upper rail 6 are located in the respective grooves 11b of the lower rail 4 and the end plates 10 are located in the respective grooves 17 of the upper rail 6. In this state, guides 21 are fitted between the left and right side plates 8 of the lower rail 4 and between the left and right guide plates 15 of the upper rail 6 on front and rear sides. The guides 21 support the upper rail 6 movably in the fore-and-aft direction X relative to the lower rail 4.

In a lock lever 22 (a lock member) of the seat track slide device 1 illustrated in FIG. 2, a pair of arm plates 23 are arranged side by side in the left-right direction Y and extend in the fore-and-aft direction X with an interval formed in between. The arm plates 23 are located adjacent to the respective side plates 14 of the upper rail 6 as depicted in 5A-5E. The left and right arm plates 23 have protrusions 24 individually projecting outward therefrom. A support plate 26 is formed to extend from one of the arm plates 23 at a position ahead of the corresponding protrusion 24 adjacent to the corresponding side plate 14 of the upper rail 6. An engageable portion 25, which connects the left and right arm plates 23 to each other in the vicinity of rear ends of the left and right arm plates 23, is provided at the rear of the protrusions 24. A plurality of lock claws 27 (lock portions) are arranged in the fore-and-aft direction X on both left and right sides of the engageable portion 25. Of the left and right arm plates 23, one of the arm plates 23 from which the support plate 26 extends is provided with a first stopper plate 28 (first stopper), which is continuous with the support plate 26 at a position ahead of and adjacent to the protrusion 24. The other arm plate 23 is provided with a first stopper plate 28 (first stopper) located face to face with the first stopper plate 28 of the aforementioned one of the arm plates 23, the first stopper plate 28 being formed adjacent to the protrusion 24 in a cantilevered fashion extending frontward from the protrusion 24.

As depicted in FIGS. 1B, 4A, 4B, and 5A-5E, the lock lever 22 is inserted into the accommodation chamber 16 of the upper rail 6, and the protrusions 24 of the lock lever 22 are fitted in the support holes 20 in the left and right side plates 14 while flexing the left and right arm plates 23 of the lock lever 22, which are arranged side by side with the left and right side plates 14 of the upper rail 6 in the left-right direction Y, respectively. When the lock lever 22 pivots, the individual lock claws 27 of the lock lever 22 becomes engaged with or disengaged from the respective lock recesses 12 in the lower rail 4 at the individual holes 18 in the upper rail 6.

An interlock support portion 30 provided at a front end of the support plate 26 of the lock lever 22 extends from the front end 6a of the upper rail 6 into an external space S ahead of the front end 6a. Also, the interlock support portion 30 has a support chamber 30e surrounded by a bottom plate 30a, left and right side plates 30b, 30c, and a top plate 30d. Also, left and right rod-like handles 31 are connected to and interlocked with each other by a connecting portion 31a. An interlock support portion 32 is provided at a proximal end of each of the left and right handles 31 in the external space S ahead of the front end 6a of each of the upper rails 6. The interlock support portion 32 is inserted into the support chamber 30e of the interlock support portion 30 of the corresponding lock lever 22 and is held by the bottom plate 30a, the left and right side plates 30b, 30c and the top plate 30d. A hook groove 32a is formed in an outer peripheral surface of the interlock support portion 32 of each handle 31.

Figures 5A, 5B, 5E:
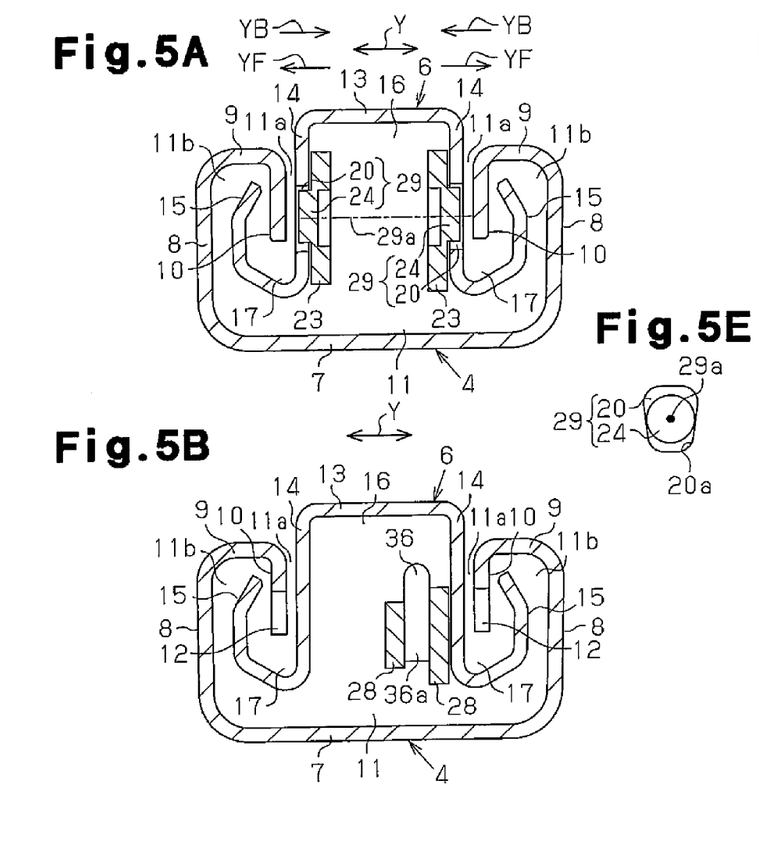
FIG. 5A is a partial schematic cross-sectional view taken along line A-A of FIG. 1B.
FIG. 5B is a partial schematic cross-sectional view taken along line B-B of FIG. 1B.
FIG. 5E is a partial side view depicting a pivot support portion configured with a support hole (recess) of an upper rail and a protrusion of a lock lever.
Figure 5C:
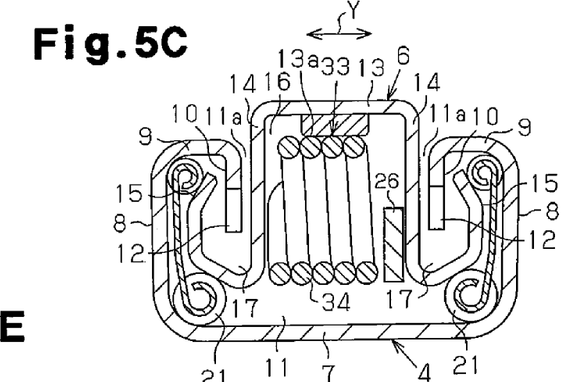
FIG. 5C is a partial schematic cross-sectional view taken along line C-C of FIG. 1B.
Figure 5D:
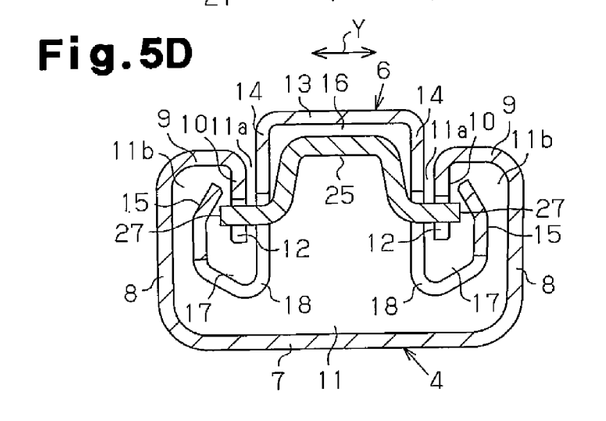
FIG. 5D is a partial schematic cross-sectional view taken along line D-D of FIG. 1B.

A torsion coil spring 33 has a coil portion 34 and a pair of arm portions 35, 36, which extend from the coil portion 34. The torsion coil spring 33 is inserted into the accommodation chamber 16 from the front end 6a of each upper rail 6. The coil portion 34 of each torsion coil spring 33 is accommodated in the accommodation chamber 16 in the vicinity of the front end 6a of the corresponding upper rail 6 and is fitted between the interlock support portion 30 of the lock lever 22 and the first stopper plates 28 of the left and right arm plates 23 and between the support plate 26 of the lock lever 22 and the side plates 14 of the upper rail 6 such that a gap between the support plate 26 and each side plate 14 is minimized. The coil portion 34 restricts movement of the lock lever 22 in the left-right direction Y, making it possible to prevent deformation of the lock lever 22. Of the two arm portions 35, 36, one arm portion 35 projects into the external space S ahead of the front end 6a of the upper rail 6 from the front end 6a, inserted into the support chamber 30e of the interlock support portion 30 in the external space S, and supported by the hook groove 32a formed in the interlock support portion 32 of the corresponding handle 31. The other arm portion 36 rests on a hook-on part 26a of the support plate 26, and a second stopper 36a formed in the vicinity of an extreme end of this arm portion 36 is inserted between the first stopper plates 28 of the left and right arm plates 23. Thus, in pivot support portions 29, in which the protrusions 24 are pivotally fitted in the respective support holes 20, the second stopper 36a engages with the first stopper plates 28, thereby preventing each of the protrusions 24 from coming off the corresponding support hole 20 in a direction YB opposite to a direction YF, in which the former is fitted into the latter so that the protrusions 24 are kept fitted in the respective support holes 20. As the arm portions 35, 36 are positioned in the aforementioned manner, the torsion coil spring 33 is kept from moving in the fore-and-aft direction X. In this state, the coil portion 34 is supported by a shaft portion 13a in the vicinity of the top plate 13 of the upper rail 6, so that an elastic force is generated by the two arm portions 35, 36. The protrusions 24 are loosely fitted in the respective support holes 20 as depicted in FIG. 5E and are pressed against the support holes 20 via the left and right arm plates 23 by the elastic force exerted by the two arm portions 35, 36. More particularly, each of the support holes 20 is formed to have a width that decreases toward the lower end. Also, the protrusions 24 are formed to have a diameter larger than the smallest width of the support holes 20. Therefore, each of the protrusions 24 is stably supported in the corresponding support hole 20 in contact with both side walls thereof.

Operation of the seat track slide device 1 will now be described.

When each of the handles 31 is at a locking position P depicted in FIGS. 1B, 2, 4A, and 4B, the elastic force produced by the torsion coil spring 33 causes the interlock support portion 32 of each handle 31 to pivot downward about a fulcrum portion 30f, which is a front edge of the top plate 30d located in the support chamber 30e of the interlock support portion 30 of the lock lever 22 and contacts the bottom plate 30a. This causes the interlock support portion 30 of the lock lever 22 to pivot downward about a pivot axis 29a of the pivot support portion 29 and the engageable portion 25 of the lock lever 22 to pivot upward about the pivot axis 29a of the pivot support portion 29, whereby the handles 31 are set in a locking state and the lock claws 27 of the engageable portion 25 become engaged with the corresponding lock recesses 12. Also, when each of the handles 31 is lifted from the locking position P against the elastic force exerted by the torsion coil spring 33, and brought to an unlocking position, the interlock support portion 30 of the lock lever 22 pivots upward about the pivot axis 29a of the pivot support portion 29 in a manner interlocked with the interlock support portion 32 of the handle 31. This causes the engageable portion 25 of the lock lever 22 to pivot downward about the pivot axis 29a of the pivot support portion 29, whereby the handles 31 are set in an unlocking state, where the lock claws 27 of the engageable portion 25 are released from the respective lock recesses 12 of the lower rail 4.

Figure 6A:
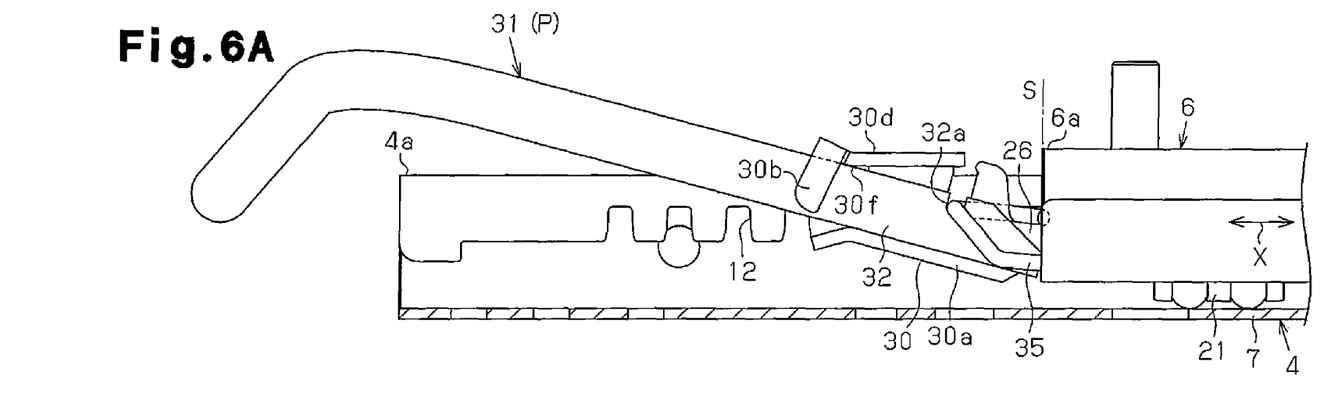
FIG. 6A is a partial cross-sectional view of the seat track slide device in a normal state as seen from one side.
Figure 6B:
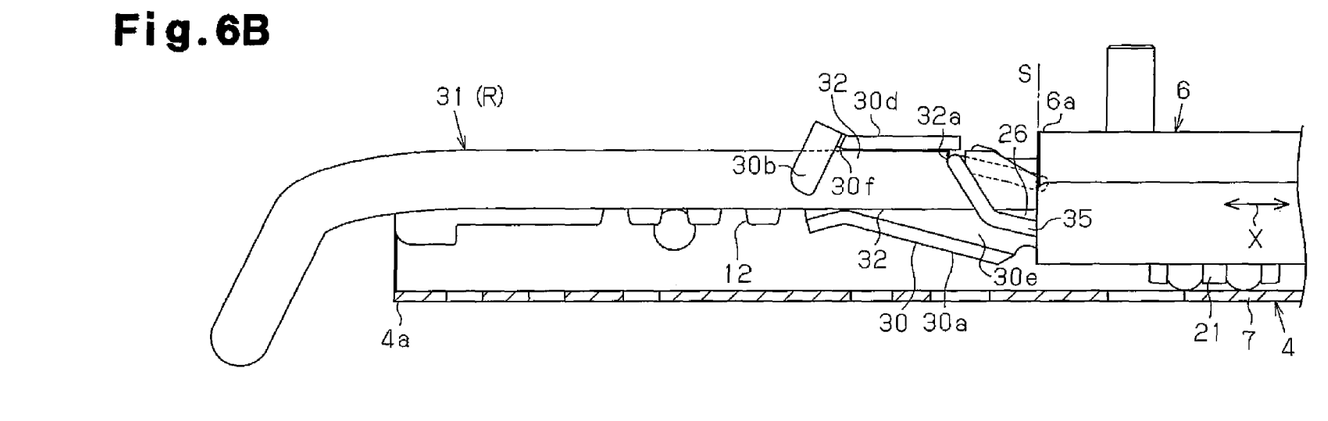
FIG. 6B is a partial cross-sectional view of the seat track slide device in an abnormal state as seen from one side.

If the lower rails 4 and the upper rails 6 of the left and right seat tracks 3 are twisted relative to each other in the event of a collision of the vehicle, at least one of the left and right handles 31, which are interlocked with each other, is brought from the locking position P to a collision-induced twisted state R as depicted in FIG. 6. As a consequence, the interlock support portion 32 of the handle 31 pivots upward about the fulcrum portion 30f, which is the front edge of the top plate 30d located in the support chamber 30e of the interlock support portion 30 of the lock lever 22, against the elastic force exerted by the torsion coil spring 33, whereby the interlock support portion 32 moves away from the bottom plate 30a. Since pivot motion of the handle 31 is not transmitted to produce pivot motion of the lock lever 22 in this state, the lock lever 22 is kept in the locking state.

The present embodiment achieves the following advantages.

(1) When inserting the lock lever 22 into the upper rail 6, it is possible to insert and fit the protrusions 24 on the arm plates 23 of the lock lever 22 in the support holes 20 in the side plates 14 of the upper rail 6 at the pivot support portions 29 while flexing both of the arm plates 23 of the lock lever 22 against elasticity to bring the arm plates 23 close to each other. This makes it possible to easily assemble the lock lever 22 in the upper rail 6.

(2) After assembling the lock lever 22 in the upper rail 6, the second stopper 36a of the arm portion 36 of the torsion coil spring 33 can be placed between the first stopper plates 28 of the arm plates 23 of the lock lever 22. It is therefore possible to prevent the protrusions 24 from coming off the support holes 20 in the individual pivot support portions 29.

(3) The torsion coil spring 33 of an existing type that interlocks each of the handles 31 and the corresponding lock lever 22 with each other in the vicinity of the upper rail 6 is provided with the second stopper 36a. This makes it possible to maintain the upper rail 6 and the lock lever 22 in an assembled state at the pivot support portions 29 with a simple structure by use of an existing component.

(4) The pivot support portions 29 are provided between the lock claws 27 of the lock lever 22 and each of the handles 31. Therefore, when a portion of the lock lever 22 close to each of the handles 31 pivots downward owing to the elastic force of the torsion coil spring 33, a portion of the lock lever 22 close to the lock claws 27 pivots upward, allowing the lock claws 27 to be engaged with the lock recesses 12 in the lower rail 4, and when the portion of the lock lever 22 close to each of the handles 31 pivots upward against the elastic force of the torsion coil spring 33, the portion of the lock lever 22 close to the lock claws 27 pivots downward, allowing the lock claws 27 to be disengaged from the lock recesses 12 in the lower rail 4. It is therefore possible to easily engage and disengage the lock claws 27 of the lock lever 22 with and from the lock recesses 12 in the lower rail 4 by operating the handles 31.

(5) While the portion of the lock lever 22 close to the lock claws 27 needs to be shaped to have an increased stiffness, the second stopper 36a of the arm portion 36 of the torsion coil spring 33 and the first stopper plates 28 of the two arm plates 23 of the lock lever 22 are provided between the pivot support portions 29 and each of the handles 31. It is therefore possible to form the second stopper 36a of the arm portion 36 into a shape that allows the second stopper 36a to be easily fitted between the first stopper plates 28 of the two arm plates 23 at the portion of the lock lever 22 close to each of the handles 31.

(6) The first stopper plate 28 of one of the arm plates 23 of the lock lever 22 facing the first stopper plate 28 of the other arm plate 23 from which the support plate 26 extends is formed to extend in a cantilevered fashion and functions as a leaf spring. Therefore, the cantilevered first stopper plate 28 becomes easier to flex and the second stopper 36a of the arm portion 36 of the torsion coil spring 33 can be easily fitted between the first stopper plates 28 of the two arm plates 23 of the lock lever 22. Also, as the second stopper 36a and the first stopper plates 28 are situated adjacent to the pivot support portions 29, the pivot support portions 29 can better perform a function of preventing the protrusions 24 from coming off the respective support holes 20.

The present invention may be configured in a different way from the foregoing embodiment as described below, for example.

In the foregoing embodiment, the second stopper 36a is provided in the arm portion 36 of the torsion coil spring 33 which interlocks the handle 31 and the lock lever 22 in the vicinity of each of the upper rails 6. However, the second stopper 36a may be provided in other types of spring like a leaf spring, for example.

The support holes 20 extending through the side plates 14 of each of the upper rails 6 are formed at the pivot support portions 29, and the protrusions 24 are formed on the lock lever 22 in the foregoing embodiment. This structure may be modified such that protrusions are formed on the side plates 14 of the upper rail 6 and support holes are formed to extend through the lock lever 22. Also, recesses that are not through holes may be formed instead of the support holes.

The second stopper 36a of the arm portion 36 of the torsion coil spring 33 and the first stopper plates 28 of the two arm plates 23 of the lock lever 22 are provided adjacent to the pivot support portions 29 between the pivot support portions 29 and each of the handles 31 in the foregoing embodiment. This structure may be modified such that the second stopper 36a and the first stopper plates 28 are provided adjacent to the pivot support portions 29 between the pivot support portions 29 and the lock claws 27 of the lock lever 22.

The interlock support portion 30 is provided on the support plate 26, which extends from one of the two arm plates 23 of the lock lever 22, and the interlock support portion 32 of each of the handles 31 is connected to that interlock support portion 30 in the foregoing embodiment. This structure may be modified such that interlock support portions are provided on support plates extending from two arm plates, and an interlock support portion of each handle is connected to those interlock support portions.

While the foregoing embodiment has presented an illustrative example of the seat track slide device 1, in which the handles 31 of the individual seat tracks 3 are interlocked with each other, the present invention may be employed in a seat track slide device in which a lock mechanism is provided in one of seat tracks only.

DESCRIPTION OF THE REFERENCE NUMERALS

1. Seat track slide device
2. Floor
4. Lower rail
5. Seat
6. Upper rail
12. Lock recesses of lower rail (lock portion)
13. Top plate of upper rail
14. Side plate
20. Support hole of upper rail (recess)
22. Lock lever (lock member)
23. Arm plate
24. Protrusion of lock lever
26. Support plate of lock lever
27. Lock claws (lock portion)
28. First stopper plate (first stopper)
29. Pivot support portion
31. Handle
33. Torsion coil spring
34. Coil portion
35, 36. Arm portions
36a. Second stopper

The invention claimed is:

1. A lock mechanism for a seat track slide device, the lock mechanism comprising:
    a lower rail configured to be fixed to a floor;
    an upper rail configured to be fixed to a seat and supported movably relative to the lower rail;
    a plurality of lock portions formed in the lower rail to be arranged in a moving direction of the upper rail;
    a lock member attached to the upper rail, the lock member having lock portions, which are engaged with and disengaged from the lock portion formed in the lower rail; and
    a handle extending from the lock member, wherein
    the lock member is inserted in the upper rail and has a pair of arm plates arranged side by side in a direction intersecting with the moving direction of the upper rail with an interval formed in between, a support plate extending from at least one of the arm plates, the handle being connected to the support plate,
    the lock member being supported pivotally with respect to the upper rail by a pivot support portion, in which a recess formed in one of the upper rail and at least one of the arm plates of the lock member is fitted on a protrusion formed on the other of the upper rail and the at least one of the arm plates of the lock member, wherein the pivot support portion, in which the recess and the protrusion are fitted together, is provided on the upper rail and the arm plates of the lock member and between the lock portions of the lock member and the handle,
    the lock member and the handle are interlocked with each other by an elastic force of a spring supported between the lock member and the handle,
    the lock member can be set to a locking state or an unlocking state by operating the handle to engage or disengage the lock member with or from the lock portions formed in the lower rail, wherein
    each arm plate of the lock member has a first stopper,
    the spring has a second stopper, which engages with the first stoppers, and
    engagement between the first and second stoppers prevents the protrusion and the recess from coming off from each other in directions opposite to directions in which the protrusion and the recess are fitted together in the pivot support portion, so that the protrusion and the recess of the pivot support portion are kept fitted together, and wherein the second stopper of the spring and the first stoppers of the arm plates of the lock member are provided between the pivot support portion and the handle.

2. The lock mechanism for a seat track slide device according to claim 1, wherein
    in one of the arm plates from which the support plate extends in the lock member, the first stopper, which is continuous with the support plate, is located between the pivot support portion and the support plate and is formed adjacent to the pivot support portion, and
    in the other arm plate, the first stopper, which faces the first stopper of the arm plate from which the support plate extends, extends in a cantilevered fashion and is adjacent to the pivot support portion.

3. The lock mechanism for a seat track slide device according to claim 1, wherein
    the spring is a torsion coil spring having a coil portion and a pair of arm portions extending from the coil portion,
    one of the arm portions is supported by the handle, and
    the other arm portion is provided with the second stopper.

4. The lock mechanism for a seat track slide device according to claim 1, wherein the protrusion of the pivot support portion is loosely fitted in the recess and is pressed against the recess by elastic force of the spring.

* * * * *